Aug. 26, 1958
J. L. AMOS ET AL
2,849,430
REMOVAL OF VOLATILE INGREDIENTS FROM
THERMOPLASTIC POLYMERS
Filed July 7, 1955
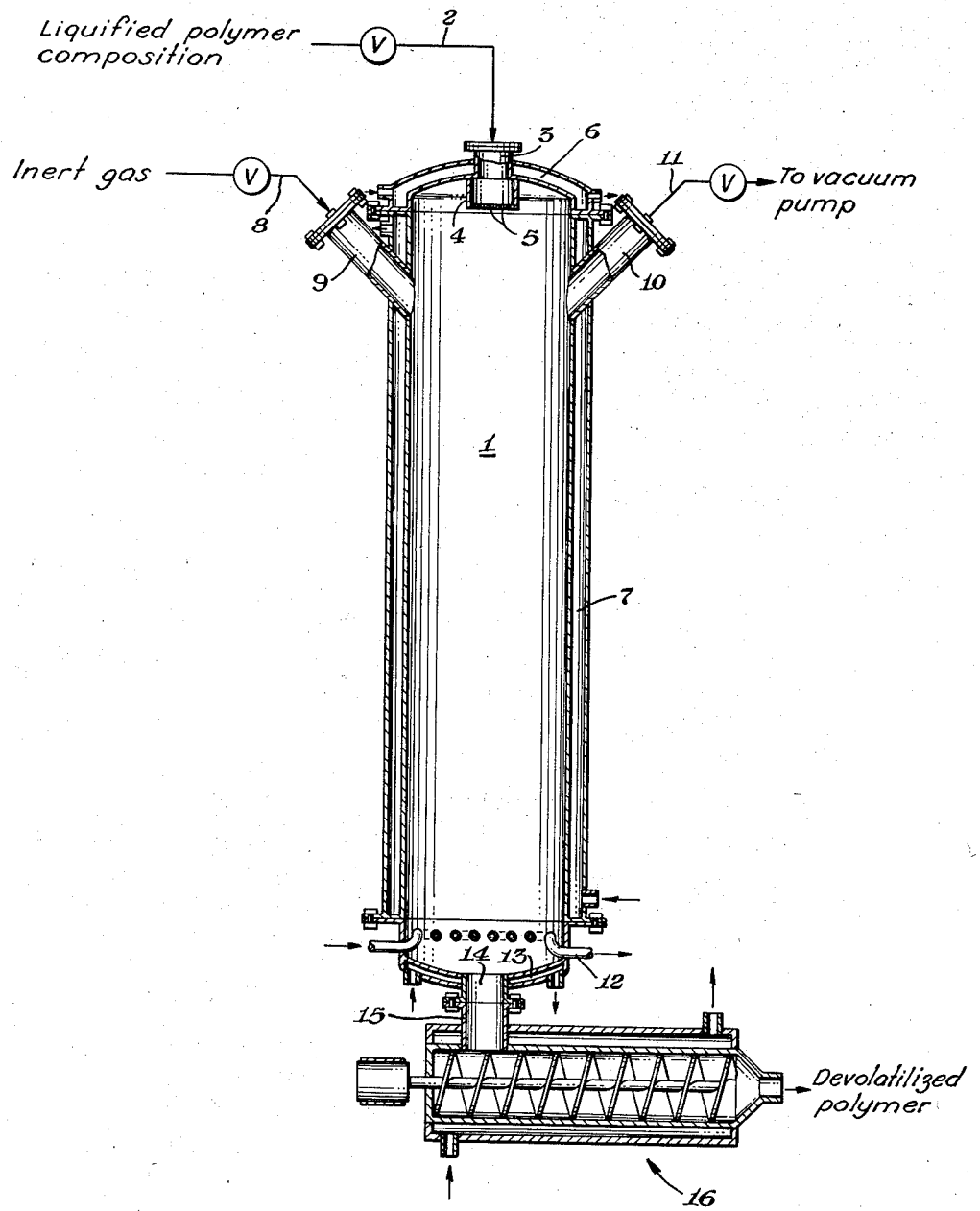
INVENTORS.
James L. Amos
Arthur J. Roche
BY
Griswold & Burdick
ATTORNEYS _United States Patent Office_

2,849,430
Patented Aug. 26, 1958

2,849,430

REMOVAL OF VOLATILE INGREDIENTS FROM THERMOPLASTIC POLYMERS

James L. Amos, Midland, and Arthur F. Roche, Freeland, Mich., assignors to The Dow Chemical Company, Midland, Mich., a corporation of Delaware Application July 7, 1955, Serial No. 520,531

3 Claims. (Cl. 260—93.5)

This invention concerns an improved method of removing volatile ingredients from thermoplastic polymer compositions which avoids, or reduces the frequency or extent of, colored bodies becoming formed and mixed with the residual polymeric material during such an operation. It pertains especially to the removal, from normally solid thermoplastic polymers of vinylidene compounds, of unconsumed monomeric material and other volatile impurities incident to formation of such polymers from the corresponding monomers. It pertains more particularly to the removal of such volatile ingredients or impurities from substantially colorless thermoplastic polymers, especially of monovinyl aromatic hydrocarbons, in a manner which avoids appreciable formation and introduction of color bodies into the residual polymeric material.

Thermoplastic polymers of vinylidene compounds, when first formed from the latter, often contain an appreciable amount of volatile impurities, e. g. unconsumed monomeric material and associated hydrocarbons or oxygenated hydrocarbons, especially aldehydes, which volatile impurities, unless removed, impair one or more of the properties of the polymer. For instance polystyrene, when first formed by the mass polymerization of styrene in a closed vessel, usually contains small amounts, e. g. a total of from 1 to 5 percent by weight or more, of volatile ingredients such as unconsumed styrene, benzaldehyde, and often one or more aromatic hydrocarbons such as benzene, toluene, or ethylbenzene. Benzaldehyde is usually present in small amount and presumably is formed by a chemical reaction of part of the styrene with minor amounts of oxygen that become absorbed in the styrene. In some processes for the production of polystyrene, or other thermoplastic polymers, the polymerization is purposely terminated short of completion, in which case a considerable amount of monomeric material may remain together with the polymer.

In instances in which the freshly formed thermoplastic polymers are obtained together with an appreciable amount, e. g. 2 percent by weight or more, of vaporizable materials such as those mentioned above the compositions have been heated to vaporize and remove the volatile ingredients. The vaporization has been accomplished in a number of ways, e. g. by kneading or otherwise mechanically working the compositions to generate the heat, or by steam-distilling the vaporizable ingredients from the compositions, or by heating the compositions under vacuum, or by combinations of such operations. A preferred procedure is to pass unsupported streams of a hot molten polymer composition through a heating zone while evacuating the zone to withdraw the vaporized ingredients therefrom and pumping the residual molten polymer from the bottom of the zone.

In all such polymer devolatilization operations, the hot polymer composition and the organic ingredients vaporized therefrom are necessarily contacted with solid structural materials. Iron or steel equipment have heretofore been used for heating the polymer compositions to vaporize and remove the volatile ingredients. In some instances, the portions of the devolatilization equipment which are contacted with the hot molten polymer compositions have been constructed of one or more of the corrosion-resistant alloy steels containing nickel and/or chromium. Regardless of whether the surfaces of the equipment in contact with the molten polymer compositions have been of an ordinary carbon steel or of a stainless steel, portions of the devolatilized polymeric products have, from time to time, been found to contain dark colored or black particles which were not present in the polymeric feed material and which, therefore, were formed during the devolatilization operation. The colored bodies appear to be formed and to contaminate the polymeric product occasionally regardless of the form, design, or mode of operation of the devolatilization equipment. Even though such contamination usually occurs only at intervals during use of a given devolatilizer, such occurrences have impaired the quality of large quantities of polymeric products and have added to the overall cost of manufacturing the polymers.

It has now been found that the colored particles that contaminate the devolatilized polymeric products are portions of a colored deposit that often forms and accumulates on inner metal surfaces of the devolatilizer and that can readily be brushed or broken from the metal surfaces and thus become embodied in the polymeric material. It has further been found that the dark colored deposits comprise carbonaceous material, usually in admixture with particles of heavy metals or their oxides, especially iron oxide and that solid organic carbonyl compounds are often, if not always, present in the dark colored deposits. It has also been found that the dark colored deposits occur for the most part on portions of the metal equipment that are brought into contact with the hot vapors being withdrawn from the molten polymer compositions and that the portions of the metal, e. g. iron or steel, surfaces that are maintained immersed in the molten polymer compositions do not accumulate such a deposit to an appreciable extent and usually remain bright or are only slightly discolored. It has still further been found that although any of the vaporizable hydrocarbons, or other volatile organic ingredients normally present as impurities in the polymer compositions can, when vaporized, react under the action of heat to form a dark colored deposit on metal surfaces in contact therewith, the rate or extent of formation of the colored deposit is greater when the vapors being tested comprise an oxygenated organic compound, e. g. an aldehyde, than when they consist only of hydrocarbons.

It appears evident from these discoveries that the dark deposits are formed by a reaction of the vapors in contact with the hot surfaces of the structural metal and that a reaction between the metal and an oxygen-containing ingredient, e. g. an aldehyde, of the vapors is usually, if not always, involved. However, the invention is not restricted by this, or any other, theory in explanation of the formation of such deposits.

It has further been found that such colored deposits either are not formed, or are formed to a much less extent, on surfaces of aluminum than on surfaces of other structural metals under otherwise similar test conditions and that by providing surfaces of aluminum or an aluminum alloy, containing a major amount, i. e. more than 50 percent, by weight of aluminum, on at least those portions of the walls of a devolatilizer that are to be contacted with the organic vapors from a thermoplastic polymer composition, the formation of the dark colored deposits and the contamination of the polymeric materials with particles of such deposits can be prevented or be reduced in extent or frequency of occurrence.

Any of the various forms or designs of polymer devolatilizers can be provided with aluminum walls for contact with the vaporized ingredients so as to obtain the advantages of the invention. Although the invention is not limited to employment of any particular form of apparatus, a devolatilizer capable of removing volatile ingredients in continuous manner from a stream of a liquefied polymer composition is advantageously used. The accompanying drawing is a schematic sketch of such a devolatilizer.

In the drawing, the numeral 1 designates a kettle which serves as the main chamber of the devolatilizer. A valved line 2 for the liquefied, or molten, polymer composition connects with an inlet 3 to the kettle. Inlet 3 leads to a cup 4 having a perforated bottom 5 which permits the polymer composition to fall as a plurality of thin unsupported streams through the open space in the kettle. The top, bottom and side walls of kettle 1 are provided with the respective jackets 6, 13 and 7, each having an inlet and outlet, as shown, for the passage of a heating fluid therethrough. In the bottom of kettle 1 is a pipe coil 12 through which a heating fluid may be passed. In the upper third of kettle 1 are pipe necks, or ears, 9 and 10. A valved line 8 for the introduction of an inert gas to the kettle 1 is shown as connected to the ear 9, but it is not essential that an inert gas be fed to the devolatilizer and said line 8 may be closed or both it and the ear 9 may be omitted. A valved vapor line 11 leads from the ear 10 to a vacuum pump, not shown. A bottom outlet 14 from the kettle 1 connects with inlet 15 to a pump 16 for withdrawing the molten polymer from the evacuated kettle, which pump may be a conventional extruder as indicated.

As hereinbefore mentioned, iron, steel, or alloy steel devolatilizers of several forms or designs, including that shown schematically in the drawing, are known to the art. According to the present invention metal surfaces of a devolatilizer, especially metal heating surfaces, that are to be contacted with organic vapors from the molten polymer composition, must be of aluminum or of an aluminum alloy containing a major amount, i. e. greater than 50, advantageously at least 70, and preferably 95 or more percent by weight of aluminum and free of metals higher than magnesium in the electromotive series. Except for this requirement as to the composition of inner walls or surfaces of the devolatilizer, any of the conventional forms of devolatilizers can be used. A devolatilizer adapted for continuous operation, such as that illustrated by the drawing, is preferred.

The devolatilizer, or its inner walls, can be constructed of aluminum or an aluminum alloy, or the walls may be of steel or other structural metal and be coated, lined, or clad on the inside with aluminum or an aluminum alloy. Steel, or a corrosion-resistant alloy steel, clad with aluminum is preferred because of the desirable mechanical properties, e. g. hardness, rigidity and strength, of the steel. Steel sprayed, or otherwise coated, with an aluminum paint can also be used, but has not been as satisfactory as aluminum-clad steel.

In practice of the invention for the devolatilization of polystyrene using an aluminum-lined devolatilizer of the form illustrated by the drawing, a stream of hot molten polystyrene, containing vaporizable organic impurities incident to its formation, is fed through line 2 and inlet 3 into the cup 4 inside the upper section of kettle 1. The kettle is preferably swept free of air, e. g. by means of an inert gas or vapor such as nitrogen, methane, steam, or carbon dioxide prior to feeding the molten polystyrene composition to the kettle. If desired a limited amount of inert gas or vapor may thereafter continue to be admitted, e. g. through line 8 and ear 9, but continuance of the inert vapor feed is not necessary and may be stopped. Vapors are withdrawn from kettle 1 through the ear 10 and line 11, preferably by action of a pump which is operated to reduce the gas pressure in kettle 1 to less than 1, and usually less than ½ atmosphere, although reduction of the pressure to below atmospheric is not always required. However, it is necessary that the polymer composition be heated under a combination of pressure and temperature conditions such as to vaporize the volatile ingredients thereof and to maintain the polymer in a heat-plastified, or molten, condition. Heat is supplied by passing a heating fluid, e. g. hot air, superheated steam, or hot oil, etc., through coil 12 and through the jackets 6, 7 and 13. The inner walls of kettle 1 are usually heated to temperatures of from 200° to 270° C., preferably from 220° to 260° C. Temperatures above 270° C. are preferably avoided since they may result in fairly rapid or extensive formation of a dark colored deposit even when using an aluminum lined devolatilizer.

The devolatilized polysterene accumulates as a molten mass in the bottom of kettle 1. It may be molded directly into useful articles or may be cooled and hardened and subsequently be molded.

The following examples illustrate the invention and certain of its advantages, but are not to be construed as limiting the invention.

EXAMPLE 1

Styrene was fed at a rate of 600 pounds per hour to a polymerization zone where it was heated, with agitation and out of contact with air, at temperatures between 80° and 140° C. Approximately half of the styrene was polymerized during flow through said zone, i. e. a hot viscous solution of about equal parts by weight of styrene and polystyrene flowed from the zone. The hot styrene-polystyrene solution was pumped directly into the top section of a devolatilizer similar to that illustrated in the accompanying drawing. Inner surfaces of the devolatilizer were of a stainless steel, i. e. an alloy of iron with lesser amounts of chromium, nickel, manganese and carbon. The inner surfaces of the devolatilizer were cleaned by sand-blasting before starting the operations described herein. Also, just prior to carrying out the present test, a rack of clean metal test plates was placed inside of the devolatilizer in a position such that the test plates would not be immersed in the liquid hydrocarbons or the molten polystyrene, but would contact the hot vapors of styrene and of other volatile ingredients from the polystyrene solution. The inner walls of the devolatilizer were heated, by passage of heat-transfer fluids through heating coils and heating jackets thereof, to temperatures of from 250° to 260° C. and vapors were at the same time pumped from the devolatilizer at a rate such as to maintain vapor pressures, inside the devolatilizer, of from 20 to 120 millimeters of mercury, absolute. The vaporization occurred during flow of the polystyrene composition as viscous, unsupported streams through the space inside of the devolatilizer. The residual molten polystyrene was pumped as a stream from the bottom of the devolatilizer. Operation as just described was continued for forty days and then terminated. The devolatilizer was dismantled and the inner surfaces of the same, and also the metal test plates that had been placed inside of the devolatilizer, were examined. The portions of the inner surfaces of the devolatilizer that had been immersed in the liquid or molten polystyrene composition were free of deposits and were only slightly discolored, but the portions of the stainless steel inner walls, or surfaces, of the devolatilizer that had been contacted with the hot vapors of styrene and other volatile ingredients from the polystyrene composition were covered with a deposit of black material. The deposit of black, or dark colored, material adhered, but not tightly, to the supporting metal surfaces, i. e. such material could readily be brushed or broken from the supporting surfaces. Analysis of a portion of such a deposit showed it to comprise carbon, or carbonaceous material, and iron oxide. It may in some instances consist only of carbonaceous material. The following table identifies metal test-plates that were placed inside of the devolatilizer just before starting the experiment and describes the condition of each at the end of the experiment.

Table I

| Test Plate | | Appearance at end of test |
|---|---|---|
| No. | Kind | |
| 1 | Aluminum | Bright and shiny; no black or dark-colored deposit. |
| 2 | An aluminum-silicone coating baked onto a base of a mild carbon steel. | Bright and shiny; no dark-colored deposit. |
| 3 | Cadmium plated on steel base. | Coated, but not heavily, with a dark-colored deposit. |
| 4 | Zinc plated on steel, i. e. galvanized steel. | Coated with a dark-colored deposit. |
| 5 | Chromium plated on steel | Heavy black deposit. |
| 6 | Tin plated on steel | Do. |
| 7 | Alloy of 98.8 percent Mg and 1.2 percent Mn. | Do. |
| 8 | Mild carbon steel, bright | Do. |
| 9 | Mild carbon steel, black | Do. |
| 10 | Stainless steel, i. e., and alloy of iron with 18-20 wt. percent of Cr, 8-11 percent of Ni, about 2 percent of Mn and about 0.08 percent of carbon. | Do. |
| 11 | Copper | Do. |
| 12 | Nickel | Do. |
| 13 | Titanium | Do. |

EXAMPLE 2

Another experiment was carried out as described in Example 1, except that in place of styrene a mixture of styrene and acrylonitrile was polymerized in continuous manner to form a copolymer of 73 percent by weight styrene and 27 percent acrylonitrile, the composition which was fed to the devolatilizer was a solution of said copolymer in about equal weight of an unconsumed portion of the above-mentioned mixture of monomers; inner walls of the devolatilizer were heated to temperatures of from 230° to 245° C.; vapors were pumped from the devolatilizer to maintain a vapor pressure of about 120 millimeters, absolute, at a point in the devolatilizer near the vapor outlet therefrom, and the experiment was terminated at the end of two weeks of continuous operation. The inner surfaces of the devolatilizer had been cleaned by sand-blasting, and clean metal test plates had been placed on a rack in the vapor space within the devolatilizer, just prior to the start of the process. After terminating operation of the process, the devolatilizer was dismantled and its inner surfaces, and the surfaces of the test plates that had been placed therein, were examined. Portions of the stainless steel inner walls of the devolatilizer that had been immersed in the liquid copolymer composition remained clean, but the portions of the inner walls that had been in contact with the hot organic vapors were covered with a black carbonaceous deposit. Table II identifies metal test plates that were contacted with hot vapors inside of the devolatilizer during the experiment and describes the appearance or condition, of each at the end of experiment.

Table II

| Test Plate | | Appearance at end of test |
|---|---|---|
| No. | Kind | |
| 1 | Aluminum | Slight even darkening in color of entire surface; no readily visible carbonaceous deposit. |
| 2 | Alloy of Mg with 1.2 percent of Mn. | A small amount of a dark colored deposit unevenly distributed. |
| 3 | Stainless steel, i. e. alloy of iron with 18-20 wt. percent of Cr, 8-11 percent of Ni, about 2 percent Mn and about 0.08 percent C. | A small amount of a black deposit unevenly distributed. |
| 4 | Galvanized steel | A fairly heavy dark-colored deposit. |
| 5 | Tin plated on steel | A heavy dark colored deposit. |
| 6 | Mild carbon steel, bright | Heavy black deposit. |
| 7 | Mild carbon steel, black | Do. |
| 8 | Nickel | Do. |
| 9 | Copper | Do. |
| 10 | Lead | Do. |
| 11 | Monel | Do. |
| 12 | Titanium | Do. |
| 13 | Tantalum | Do. |

EXAMPLE 3

A series of experiments on the vaporization of various organic liquids during downward flow through heated tubes of various metals was carried out for purpose of determining which combinations of vaporizable organic materials and metal heating surfaces resulted in formation of the dark colored deposits on the metals and to determine the kinds of dark colored deposits that are formed. The vaporizable organic liquids that were used in the respective experiments were of kinds that occur as volatile ingredients incident to the manufacture of various solid polymers of vinylidene compounds, e. g. in the manufacture of polystyrene, or of polyvinyltoluene, or of polymers of ar-chlorostyrene, or of interpolymers of styrene and a synthetic rubber, or of polyethylene, etc. In each experiment, the organic liquid was fed at a rate of 40 grams per hour into a bed of a packing material filling the upper 14 inches of a vertical tube which was 3 feet long and of ¾ inch internal diameter and was situated inside of an electric heating unit for heating the full length of the tube. The heating unit was operated to vaporize the organic liquid and to bring the resulting down-flowing vapors to a temperature of from 250° to 260° C. at the bottom, i. e. the outlet, end of the tube. The effluent vapors were cooled to condense the liquid. Tubes of different metals were used in the various experiments. Porcelain Berl saddles were used as the packing material in the upper section of the otherwise open tube in some of the experiments and small pieces of the same kind of metal of which the tube was constructed were used as the packing material in other experiments. The upper packed portion of each tube will hereinafter be termed the vaporization chamber of the tube. After each experiment had been carried out in the above-described manner for the number of hours indicated in Table III, the experiment was terminated. The packing material was removed and both it and the inner surfaces of the lower open portion of the tube were examined. Table III identifies the organic liquid and indicates the kinds of metal tube and of packing material that were used in each experiment. It gives the number of hours over which each experiment was carried out. It also describes the condition of the packing material and of the inner surfaces of the tube and, in instances in which a dark colored deposit, or formation, was found, indicates the composition of the deposit or formation. Ingredients present in the dark colored deposit were identified by spectrometric analyses and by visual inspection. In the table, the term "carbonaceous material" is abbreviated as "Carb. Mat."

Table III

| Test No. | Organic Feed Liquor | Tube | Packing | Length of run hrs. | Condition of Packing | Condition of Tube | Ingredients of Deposit or Dark Formation |
|---|---|---|---|---|---|---|---|
| 1 | Ethylbenzene | Iron | Berl Saddles | 449 | Discolored | Dark deposit | $Fe_3O_4$, FeO, Fe, Quartz, Carb. Mat. |
| 2 | 90 percent ethylbenzene and 10 percent mineral oil. | ___do___ | ___do___ | 330 | Clean | ___do___ | $Fe_3O_4$, FeO, Fe, Carb. Mat. |
| 3 | Ethylbenzene | Stainless Steel [1] | ___do___ | 333 | Discolored | Dark deposit, small am't of— | Quartz, mullite, Fe, $Al_2O_3$, Carb. Mat. |
| 4 | ___do___ | Copper | ___do___ | 379 | Dark colored | Red deposit | Cu, $Cu_2O$, CuO, Carb. Mat. |
| 5 | ___do___ | Aluminum | Aluminum turnings. | 324 | Only a few are slightly colored. | Clean | |
| 6 | Liquor from devolatilization of interpolymer of styrene and a styrene-butadiene rubber. | Stainless Steel [1] | Stainless Steel. | 18 | A few pieces are slightly discolored. | Dark deposit | Not analyzed. |
| 7 | ___do___ | Alloy of about 97 percent Al and small am't of Mn, Fe, Si, Cu, Zn. | Same aluminum Alloy. | 136 | ___do___ | Clean | |
| 8 | Liquor from devolatilization of copolymer of styrene and acrylonitrile; comprises ethylbenzene, styrene and acrylonitrile. | ___do___ | ___do___ | 24 | Clean | ___do___ | |
| 9 | ___do___ | Carbon steel | Steel | 24 | Dark colored | Dark deposit | Not analyzed. |
| 10 | m-xylene | Stainless Steel [1] | Berl Saddles | 336 | Black deposit | Slight Colored deposit. | An aliphatic carbonyl compound, Carb. Mat. |
| 11 | Benzene | ___do.[1]___ | ___do___ | 336 | ___do___ | ___do___ | Not analyzed. |
| 12 | ___do___ | Copper | ___do___ | 336 | ___do___ | Dark deposit | Do. |
| 13 | 99 percent benzene and 1 percent benzaldehyde. | Stainless Steel | ___do___ | 336 | ___do___ | Black deposit | Do. |
| 14 | ___do___ | Copper | ___do___ | 336 | ___do___ | ___do___ | Do. |

[1] An alloy of iron with 18-20 percent Cr, 8-11 percent Ni, 2.0 percent Mn, and 0.08 percent C.

It is evident from the analyses given in runs 1–4 and 10 of Table III that metals or metal oxides are usually, if not always, present together with carbonaceous material in the dark deposits of the kinds often formed inside of a devolatilizer during use of the same. It is probable that the metal oxide ingredients of such deposits are formed by reaction of hot metal surfaces with organic carbonyl compounds, e. g. aldehydes, present in the ingredients vaporized from the polymers, but the invention is not limited to this or any other theory in explanation of the results obtained. Polymerizable vinylidene compounds have, in most instances, a strong affinity for oxygen and it usually is not possible to completely exclude oxygen from the mixtures used in making the polymers. Run 13, as compared with run 11, indicates that the extent to which a dark colored deposit is formed upon contact of the organic vapors with the heated metals is increased by the presence of a minor amount of an aldehyde in the vapors.

EXAMPLE 4

In each of two experiments a clean, shiny metal test piece was immersed to about ¾ of its length in a hot bath of molten polyethylene which was contained in a closed glass vessel. Some air was present in the vapor space within the vessel. A rod of mild carbon steel was employed as the test piece in one experiment and a strip of aluminum was used in the other experiment. About ¼ of the length of each test piece projected into the vapor space above the molten polyethylene. Each molten polyethylene bath, having a portion of the metal test piece immersed therein, was heated at 200° C. for 24 hours. At the end of that time, the portion of the steel rod that was immersed in the polyethylene remained clean, bright, and shiny, but the portion that projected into the vapor space above the polyethylene was of dark color. In contrast, all portions of the aluminum strip remained clean, bright and shiny at the end of the test in which it was employed.

EXAMPLE 5

This example summarizes the results which were obtained by devolatilizing one portion of an opaque interpolymer of styrene and a minor amount of a rubbery copolymer of about 25 per cent styrene and 75 per cent butadiene in a steel devolatilizer similar to that shown in the drawing and devolatilizing another portion of the same interpolymer in a devolatilizer of the same type (i. e. wherein thin streams of the interpolymer composition are heated under vacuum and residual polymeric material is pumped from the devolatilizer) except that the inner walls thereof were of aluminum. The interpolymer was produced by partially polymerizing a solution of about 5 parts of the rubbery copolymer of about 25 per cent styrene and 75 per cent butadiene in about 95 parts of styrene. Separate streams of the partially polymerized product were fed continuously to the respective devolatilizers just mentioned for a period of 33 days while heating inner walls of the devolatilizers to temperatures of from 240° to 250° C., applying vacuum to aid in vaporizing the volatile ingredients of the feed mixtures and to withdraw the vapors from the devolatilizers, and pumping the residual devolatilized interpolymer product (which retained less than 1 per cent by weight of vaporizable ingredients) from the respective devolatilizers. Samples of the devolatilized interpolymer from the respective devolatilizers were collected daily and were examined and rated for color and clarity, i. e. for the presence of visible specks of incompatible polymeric material. Although the interpolymer as a whole was opaque, when it was free of such visible specks it was considered as being clear. The color ratings ranged from A (for colorless material) to H (for interpolymer product having a pronounced color, usually of yellow or gray). The clarity ratings ranged from A (for clear product free of specks or smears) to C (for samples of polymer product containing readily visible specks or smears throughout the same). Over the 33 day period of operation, the samples of interpolymer product from the steel devolatilizer were given color ratings of from C to H and were given clarity ratings which ranged from between A and B to between B and C. None of the interpolymer samples from the steel devolatilizer was rated A, either as to color or clarity. In contrast, all of the interpolymer samples from the aluminum devolatilizer were rated A as to color, i. e. they were substantially colorless, and were given ratings of A, or of between A and B, as to clarity. Most of the samples of devolatilized interpolymer from the aluminum devolatilizer were clear and colorless, i. e. were rated A both as to color and clarity.

We claim:

1. A method for removing, from non-volatile thermoplastic polymers of vinylidene compounds, vaporizable organic ingredients that are present as impurities incident to formation of the polymers from such compounds, which method comprises heating the polymer composition containing said ingredients in a vessel under conditions of temperature and pressure such as to vaporize said ingredients, the temperature being of a range of from about 200° to about 270° C., the portions of said vessel that are thereby contacted with the vaporized organic ingredients being composed of a metal composition containing aluminum as the principal ingredient and free of metals higher than magnesium in the electromotive series, and withdrawing the vapors from the vessel.

2. A method for removing, from normally solid thermoplastic polymers of vinylidene compounds which polymers are selected from the group consisting of polystyrene, polyvinyltoluene, polymerized ar-chlorostyrene, polyethylene, copolymers of styrene and acrylonitrile, and copolymers of styrene with styrene-butadiene synthetic rubber, vaporizable impurities, including a polymerizable monomeric material, incident to formation of the polymers from such compounds without forming and introducing colored impurities into admixture with the polymers, which method comprises heating the impure polymer containing such ingredients at sub-atmospheric pressure to a temperature sufficient to vaporize the vaporizable ingredients and of a range of from about 200° to about 270° C. in a vessel, all inner surfaces of which vessel that are contacted with the vapors being composed of a metal composition containing at least 70 percent by weight of aluminum and free of metals higher than magnesium in the electromotive series, and withdrawing the vapors from the vessel.

3. A method as claimed in claim 2, wherein the impure polymer containing the volatile ingredients is fed in molten condition to an upper section of the heated vessel and is caused to descend as at least one unsupported stream within the vessel while withdrawing the vaporized ingredients from the vessel, and withdrawing the residual devolatilized polymer as a stream from a bottom section of the vessel.

References Cited in the file of this patent

UNITED STATES PATENTS

| | | |
|---|---|---|
| 2,011,132 | Young et al. | Aug. 13, 1935 |
| 2,555,939 | Sherwin | June 5, 1951 |
| 2,691,008 | Grim | Oct. 5, 1954 |
| 2,713,043 | Daumiller | July 12, 1955 |